United States Patent
Teh

(10) Patent No.: US 10,579,552 B1
(45) Date of Patent: Mar. 3, 2020

(54) INTERFACE ARCHITECTURE FOR MASTER-TO-MASTER AND SLAVE-TO-MASTER COMMUNICATION

(71) Applicant: Intel Corporation, Santa Clara, CA (US)

(72) Inventor: Chee Hak Teh, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 321 days.

(21) Appl. No.: 15/429,018

(22) Filed: Feb. 9, 2017

(51) Int. Cl.
| | |
|---|---|
| G06F 13/16 | (2006.01) |
| G06F 13/364 | (2006.01) |
| G06F 13/42 | (2006.01) |
| G06F 5/06 | (2006.01) |

(52) U.S. Cl.
CPC .......... G06F 13/1673 (2013.01); G06F 5/065 (2013.01); G06F 13/364 (2013.01); G06F 13/4282 (2013.01); G06F 2205/067 (2013.01)

(58) Field of Classification Search
CPC .................................................. G06F 17/5068
See application file for complete search history.

(56) References Cited

U.S. PATENT DOCUMENTS

| | | |
|---|---|---|
| 14,882,065 | 10/2015 | Teh et al. |
| 14,981,220 | 12/2015 | Teh |
| 2004/0120442 A1* | 6/2004 | Emberling ........... G11C 7/1066 375/372 |
| 2008/0071998 A1* | 3/2008 | Carson .................. H04J 3/0623 711/154 |
| 2016/0098061 A1 | 4/2016 | Teh |

* cited by examiner

*Primary Examiner* — Ilwoo Park
*Assistant Examiner* — Juanito Borromeo
(74) *Attorney, Agent, or Firm* — Fletcher Yoder, P.C.

(57) ABSTRACT

A communication interface includes one or more input/output circuitries, each input/output circuitry including a pointer generation block that controls write pointers of a respective input/output circuitry and read pointers of the respective input/output circuitry. Each input/output circuitry also includes input/output buffers communicatively coupled to the pointer generation block. Each input/output circuitry further includes a receive delay-locked loop that provides a clock signal to the plurality of input/output buffers. Each input/output circuitry also includes one or more transmit delay-locked loops that delay the clock signal.

20 Claims, 11 Drawing Sheets

INTERFACE ARCHITECTURE FOR MASTER-TO-MASTER AND SLAVE-TO-MASTER COMMUNICATION

BACKGROUND

The present disclosure relates generally to a communication interface of an integrated circuit or die that couples to an additional integrated circuit or die. More particularly, the present disclosure relates to enabling both master-to-master and slave-to-master communication between the interface and the additional integrated circuit.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An integrated circuit or die may include an interface to communicatively couple the integrated circuit or die to another electronic component. For example, a field-programmable gate array (FPGA) may include a communication interface that communicably couples to a memory device. When coupled, the communication interface may act as a master in a master-to-slave communication relationship with the memory device. That is, the communication interface may control the memory device (e.g., such that the communication interface acts as the master and the memory device acts as a slave). For example, the communication interface may initiate memory transactions and the memory device may respond accordingly.

When the FPGA is communicatively coupled to an additional integrated circuit (e.g., another FPGA, an application-specific integrated circuit (ASIC), an application specific standard product (ASSP), and the like), the communication interface may or may not act as the master. For example, the communication interface may act as the slave while the additional integrated circuit may act as the master. That is, the additional integrated circuit may issue commands to the communication interface. As another example, both the communication interface and the additional integrated circuit may act as masters. That is, the communication interface may issue commands to the additional integrated circuit, and the additional integrated circuit may also issue commands to the communication interface. However, the communication interface may receive the commands from the additional integrated circuit without knowledge of when the commands will arrive, resulting in synchronization problems.

Additionally, the commands may be issued using a free running clock (e.g., such that a write clock includes regular pulses) or a strobe-based clock (e.g., such that the write clock only includes pulses when writing is desired or enabled). The communication interface may not know in advance which clocking scheme the additional integrated circuit is using to issue commands.

Moreover, the communication interface may store the commands and/or associated data in input/output circuitry of the communication interface. The communication interface may bond multiple input/output circuitries to store commands and/or associated data that span a large width. However, enabling storage by bonding multiple input/output circuitries may undesirably increase peak current consumption of the communication interface.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to a communication interface of an integrated circuit or die that couples to an additional integrated circuit or die. More particularly, the present disclosure relates to enabling master-to-slave, master-to-master, and slave-to-master communication between the communication interface and the additional integrated circuit. The communication interface may include multiple input/output circuitries distributed along the communication interface. Each communication interface may include multiple sets of programmable single-ended input/output (PSIO) buffers and multiple programmable differential/single-ended input/output (PDIO) modules that share a centralized pointer generation block. A received clock signal shared by the PSIO buffers and the PDIO modules may be supported either as a free running or strobe-based clock signal, and read first in first out (FIFO) latches of the PSIO buffers and/or the PDIO modules may push or pull data. In this manner, the communication interface may function as either a slave or master in master-to-slave, master-to-master, or slave-to-master configurations with other integrated circuits. Moreover, the read FIFO latches may only switch at most two entries (e.g., closing one latch and opening the other) with each clock edge, regardless of the depth of the read FIFOs. This may reduce the switching of the read FIFO latches, enabling control of peak current consumption of the communication interface.

In one example, a communication interface includes one or more input/output circuitries, each input/output circuitry including a pointer generation block that controls write pointers of a respective input/output circuitry and read pointers of the respective input/output circuitry. Each input/output circuitry also includes input/output buffers communicatively coupled to the pointer generation block. Each input/output circuitry further includes a receive delay-locked loop that provides a clock signal to the plurality of input/output buffers. Each input/output circuitry also includes one or more transmit delay-locked loops that delay the clock signal.

In another example, a communication interface includes input/output modules distributed along the communication interface. Each input/output module includes a pointer generation block that controls write pointers of a respective input/output module and read pointers of the respective input/output module. Each input/output module also includes programmable single-ended input/output (PSIO) buffers communicatively coupled to the pointer generation block, wherein each PSIO buffer of the plurality of PSIO buffers includes read first in first out (FIFO) latches. Each input/output module further includes a receive delay-locked loop that provides a clock signal to the PSIO buffers. Each input/output module also includes one or more transmit delay-locked loops that delay the clock signal.

In yet another example, a system includes a memory device. The system also includes a first integrated circuit that includes a communication interface coupled to the memory device. The communication interface includes input/output circuitries distributed along the communication interface. Each input/output circuitry includes a pointer generation block that controls write pointers of a respective input/output circuitry and read pointers of the respective input/output circuitry. Each input/output circuitry also includes programmable single-ended input/output (PSIO) buffers communicatively coupled to the pointer generation block. Each input/output circuitry further includes programmable differential/single-ended input/output (PDIO) modules communicatively coupled to the pointer generation block. Each input/output circuitry also includes a receive delay-locked loop that provides a clock signal to the PSIO buffers and the PDIO modules. Each input/output circuitry further includes one or more transmit delay-locked loops that delay the clock signal. The system further includes a second integrated circuit communicatively coupled to the communication interface.

Various refinements of the features noted above may be made in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present invention alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

An integrated circuit or die may include a communication interface that communicatively couples circuitry of the integrated circuit or die to other circuitry of the integrated circuit or die or to a secondary integrated circuit or die. For example, a programmable logic device such as a field-programmable gate array (FPGA) may include a communication interface that communicably couples the FPGA to a memory device. While this disclosure generally describes an FPGA in communication with a memory device by way of example, the communication interface of this disclosure may facilitate communication between any suitable circuitry. For example, the type of integrated circuits or die that may communicate via the communication interface of this disclosure may include a programmable logic device such as an FPGA, a processor (e.g., a central processing unit or a graphics processing unit), a system-on-chip (SOC), an application-specific integrated circuit (ASIC), a memory device, a network interface, or the like.

Figure 1:
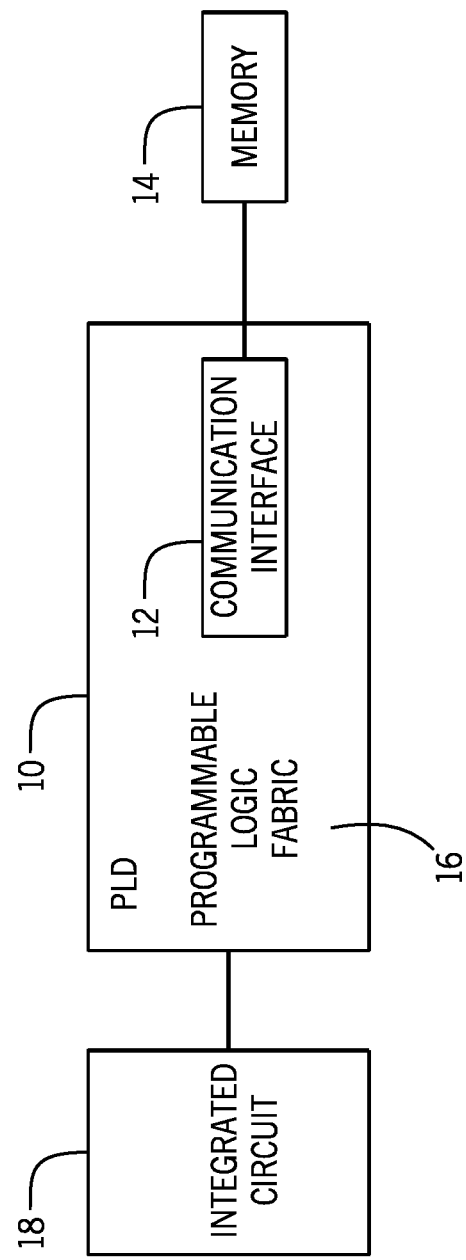
FIG. 1 is a schematic diagram of an integrated circuit that includes a communication interface that communicatively couples the integrated circuit to a memory device, in accordance with an embodiment.

To reiterate, while the examples that follow refer to a communication interface between a programmable logic device and a memory device, the communication interface of this disclosure should be understood to enable communication between any two integrated circuits or die. FIG. 1 is a schematic diagram of a programmable logic device (PLD) 10 that includes a communication interface 12 that communicatively couples the programmable logic device 10 to a memory device 14, in accordance with certain embodiments. While the present disclosure describes the communication interface 12 of the programmable logic device 10, it should be understood that the disclosed embodiments may apply to any integrated circuit that includes the communication interface 12. The programmable logic device 10 also includes programmable logic fabric 16, which may include logic units of the programmable logic device 10, such as logic modules (e.g., adaptive logic modules), look-up tables, adaptive look-up tables, flip-flops, arithmetic logic, and the like. The memory device 14 may include any suitable memory that stores information, such as control software, look up tables, configuration data, and the like. In some embodiments, the memory device 14 may be part of the programmable logic device 10 (e.g., share the same die). The memory device 14 may include a tangible, non-transitory, machine-readable-medium, such as a volatile memory (e.g., a random access memory (RAM)) and/or a nonvolatile memory (e.g., a read-only memory (ROM)). For example, the memory device 14 may be dynamic RAM (DRAM), such as quad data rate (QDR) wide input output (WIO) static RAM (SRAM), high bandwidth memory (HBM) DRAM, and the like. The memory device 14 may include one or more storage devices (e.g., nonvolatile storage devices) that may include ROM, flash memory, a hard drive, or any other suitable optical, magnetic, or solid-state storage medium, or a combination thereof.

The communication interface 12 may couple the programmable logic device 10 to the memory device 14. When coupled, the communication interface 12 may act as a master in a master-to-slave communication relationship with the memory device 14. That is, the communication interface 12 may issue commands and/or control the memory device 14 (e.g., such that the communication interface 12 acts as the master and the memory device 14 acts as a slave). For example, the communication interface 12 may initiate memory transactions and the memory device 14 may respond accordingly. In some embodiments, the communication interface 12 may include or couple to a memory controller that controls the communication interface 12 and/or the memory device 14.

When the programmable logic device 10 and/or the communication interface 12 are communicatively coupled to an additional integrated circuit 18 (e.g., another programmable logic device such as an FPGA, an application-specific integrated circuit (ASIC), an application specific standard product (ASSP), or the like), the communication interface 12 may or may not act as the master. For example, the programmable logic device 10 and the additional integrated circuit 18 may implement two-and-a-half dimensional (2.5D) semiconductor architecture. 2.5D semiconductor architecture refers to connecting two or more silicon die via an interconnect bridge (e.g., a silicon interposer, Intel Corporation's Embedded Multi-die Interconnect Bridge (EMIB), and the like) on the same package to improve silicon scalability. Additional information related to 2.5D semiconductor architecture is included in U.S. patent application Ser. No. 14/692,133, entitled "Scalable 2.5D Interface Architecture," which is incorporated herein by reference in its entirety for all purposes. Although the present disclosure describes the communication interface 12 as a 2.5D memory architecture solution, it should be understood that the communication interface 12 may support any suitable 2.5D or 3D interface that is either on a main die or a daughter die. In some embodiments, the additional integrated circuit 18 or die may include one or more memory devices. In alternative embodiments, the additional integrated circuit 18 or die may not include a memory device.

Figure 2:
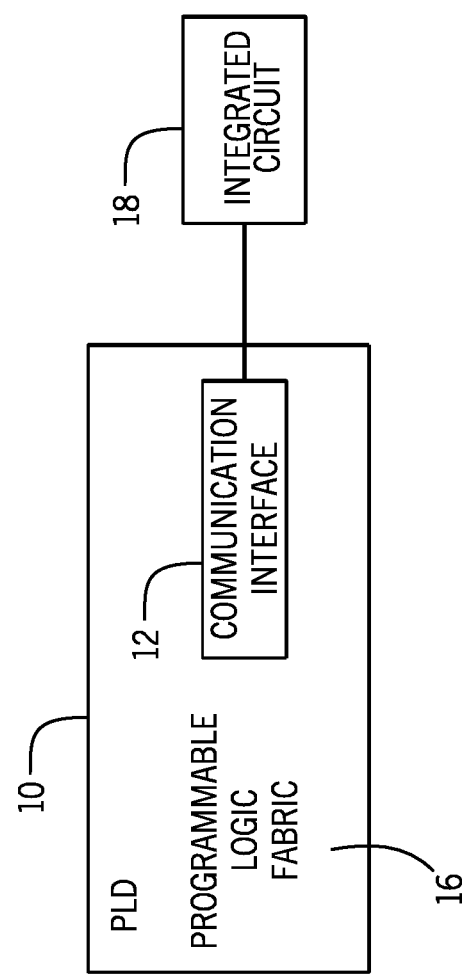
FIG. 2 is a schematic diagram of the integrated circuit of FIG. 1 that includes the communication interface acting as a slave while an additional integrated circuit acts as the master, in accordance with certain embodiments.

The communication interface 12 may act as the slave while the additional integrated circuit 18 may act as the master, as shown in, for example, FIG. 2. FIG. 2 is a schematic diagram of the programmable logic device (PLD) 10 of FIG. 1 that includes the communication interface 12 acting as a slave while the additional integrated circuit 18 acts as the master, in accordance with certain embodiments. That is, the additional integrated circuit 18 may issue commands to the communication interface 12. As another example, both the communication interface 12 and the additional integrated circuit 18 may act as masters. FIG. 2 illustrates this case as well. That is, the communication interface 12 may issue commands to the additional integrated circuit 18, and the additional integrated circuit 18 may also issue commands to the communication interface 12. In some embodiments, an additional communication interface of the additional integrated circuit 18 may couple to the communication interface 12 of the programmable logic device 10.

However, the communication interface 12 may receive the commands from the additional integrated circuit 18 without knowledge of when the commands arrive, resulting in synchronization problems. Additionally, the commands may be issued using a free running source synchronous clock (e.g., such that a write clock includes regular pulses) or a strobe-based source synchronous clock (e.g., such that the write clock only includes pulses when writing is desired). The communication interface 12 may not know in advance which clocking scheme the additional integrated circuit 18 uses to issue commands. Moreover, the communication interface 12 may store the commands and/or associated data in input/output circuitry of the communication interface 12. The communication interface 12 may bond multiple input/output circuitries or modules to store commands and/or associated data that span a large width. However, enabling storage by bonding multiple input/output circuitries may undesirably increase peak current consumption of the communication interface 12 because read first in first out (FIFO) latches of the communication interface 12 may be deepened to handle mismatch between larger bonded input/output circuitries.

Figure 3:
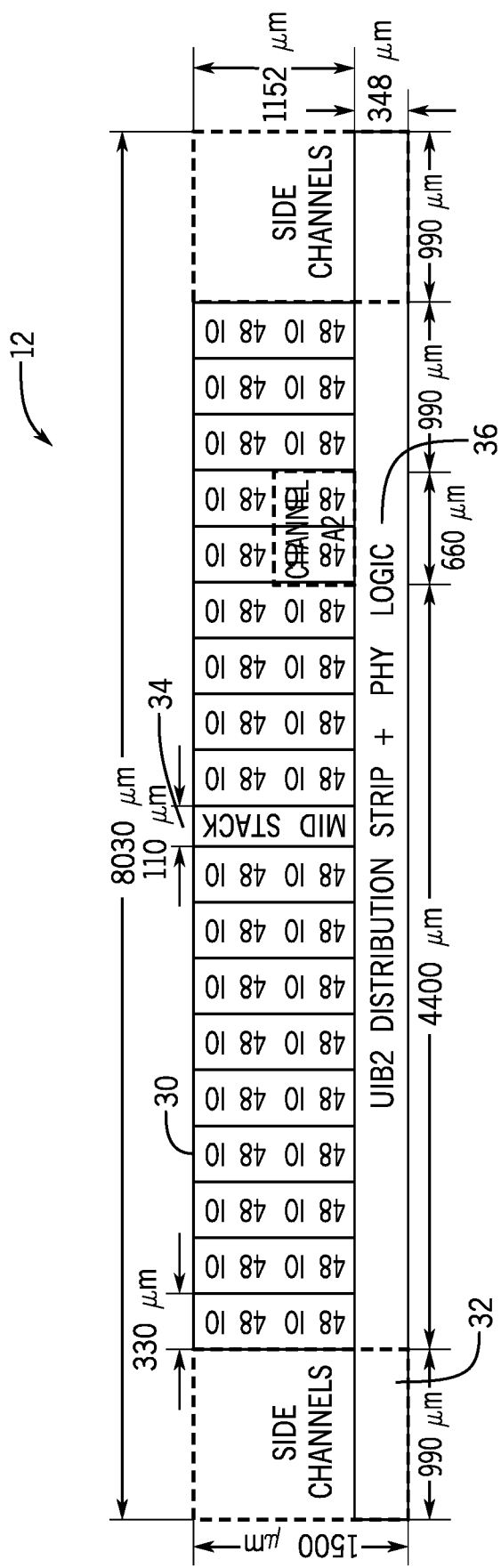
FIG. 3 is a schematic diagram of the communication interface of FIG. 1, in accordance with an embodiment.

FIG. 3 is a schematic diagram of the communication interface 12 of FIG. 1, in accordance with an embodiment. As illustrated, the communication interface block 12 is organized in a modular manner and includes multiple 48-IO circuitries or modules 30 (including side channels 32) and a middle odd module known as the mid-stack module 34. The 48-IO module 30 may include 48 input/output channels that may independently serve as inputs, outputs, in-wired OR mode, or the like. It should be understood that the 48-IO module 30 is an example of input/output circuitry or an input/output module that may be used in the present disclosure, and any suitable input/output circuitry or module with any suitable number of channels is contemplated.

Distribution strip and physical layer (PHY) logic area 36 includes synthesizable control logic required for input/output (I/O) calibration and staging. Each 48-IO module 30 may be configured as either a data or command module. A command module may occupy half of the 48-IO module 30 such that adjacent channels may physically share a 48-IO module 30. This may allow for better pin utilization as well as matching the micro-bump organization of the communication interface standards. A combination of more than one 48-IO module 30 may be used to form an interface to the memory device 14. The dimensions shown in FIG. 3 are illustrative and not limiting as to the dimensions of the communication interface 12. The illustrative embodiment in the present disclosure utilizes multiple 48-IO modules 30, but the disclosure is not so limited. Instead, the illustrative embodiments may utilize another appropriate type of module. The 48-IO module 30 is an I/O module capable of providing dual source bi-directional source-synchronous signaling capabilities.

Figure 4:
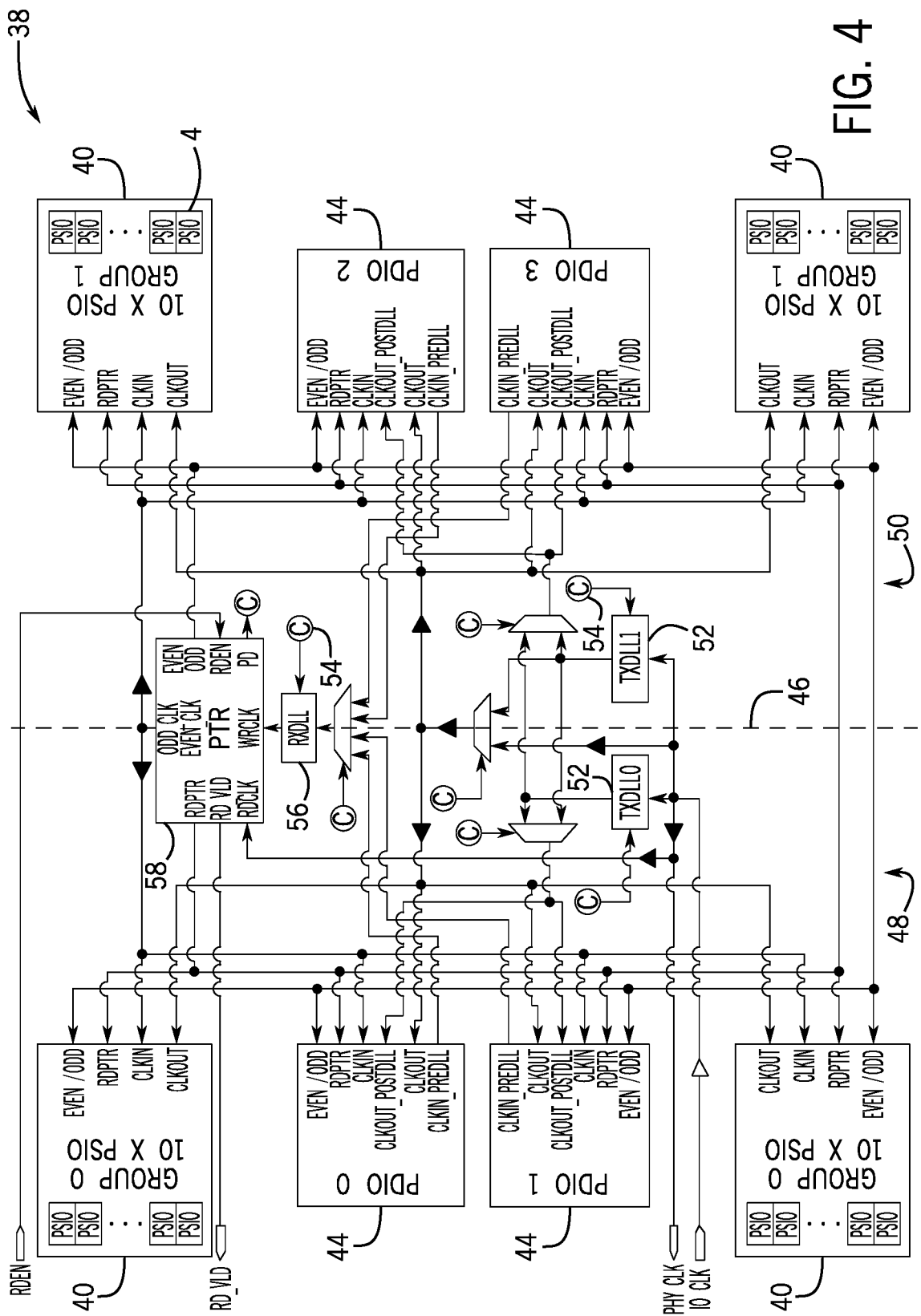
FIG. 4 is a schematic diagram of a clock partitioning portion of input/output circuitry of the communication interface of FIG. 3, in accordance with an embodiment.

FIG. 4 is a schematic diagram of a clock partitioning portion 38 of the 48-IO module 30 of FIG. 3, in accordance with an embodiment. As illustrated, the clock partitioning portion 38 of the 48-IO module 30 includes two programmable single-ended input/output (PSIO) groups, each PSIO group (e.g., group 0 or group 1) including two sets 40 of 10 PSIO buffers 42 each. The clock partitioning portion 38 of the 48-IO module 30 also includes four programmable differential/single-ended input/output (PDIO) modules 44. In some embodiments, the PDIO modules 44 each include PDIO buffers.

As shown, clock topology within the clock partitioning portion 38 of the 48-IO module 30 is partitioned via a virtual partition 46 such that only one set of clocks may be redistributed from either half of the PDIO modules 44 on one side 48 of the virtual partition 46, and another set of clocks may be redistributed to the other side 50. This virtually partitions the clock partitioning portion 38 of the 48-IO module 30 into two 24-IO components 48 and 50, enabling one 48-IO module 30 to be shared across two adjacent channels.

The PDIO modules 44 (e.g., PDIO 0 and PDIO 1) on one side 48 of the virtual partition 46 may share a transmit delay-locked loop (DLL) 52 (e.g., TXDLL0) and the PDIO modules 44 (e.g., PDIO 2 and PDIO 3) on the other side 50 may share another transmit DLL 52 (e.g., TXDLL1). Each set 40 of PSIO buffers 42 and each PDIO module 44 may be configured as two PSIO buffers 42 sharing a common clock 54. In some embodiments, the transmit DLL 52 may delay the common clock 54.

Each set 40 of PSIO buffers 42 and each PDIO module 44 may receive the common clock 54 from a shared receive DLL 56 (e.g., RXDLL) via a central pointer generation block 58. The receive DLL 56 may select any PDIO module 44 as the common clock 54. The common clock 54 may be a free-running clock or a strobe-based clock. In this manner, use of the dedicated transmit DLLs 52 and receive DLL 56 for transmit and receive data paths may simplify transmit and receive clock selection within the 48-IO module 30.

Figure 5:
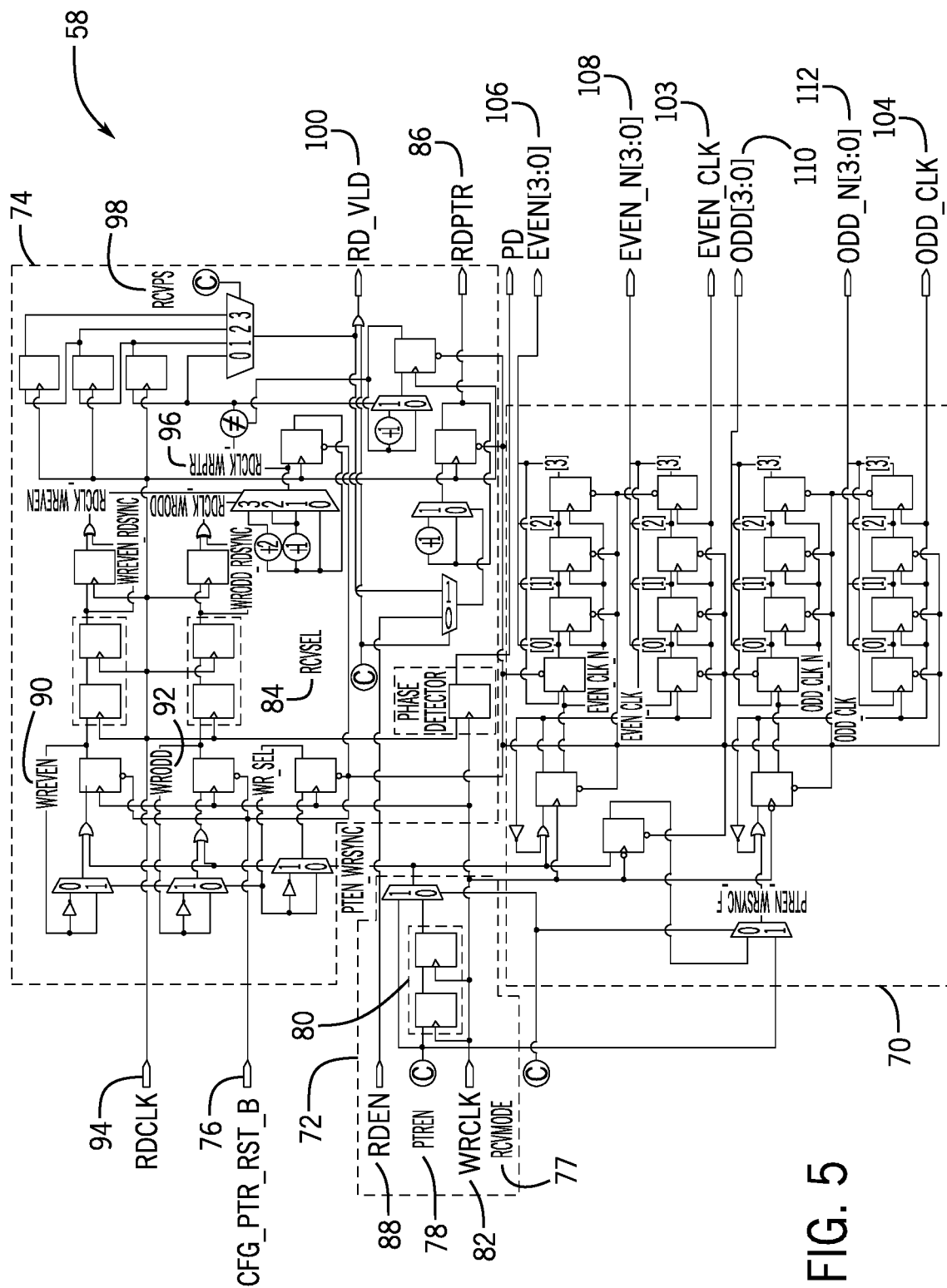
FIG. 5 is a schematic diagram of a pointer generation block of the clock partitioning portion of the input/output circuitry of FIG. 4, in accordance with an embodiment.

FIG. 5 is a schematic diagram of the pointer generation block 58 of FIG. 4, in accordance with an embodiment. The pointer generation block 58 may control load or write and unload or read pointers within a respective 48-IO module 30. The pointer generation block 58 may synchronize the write pointers used by read first in first out (FIFO) latches of each set 40 of PSIO buffers 42 and each PDIO module 44, enabling reliable capture of incoming data using either a free-running clock (e.g., a CK_t/c signal for an ASIC or ASSP) or a strobe-based clock (e.g., RDQS_t/c for an HBM DRAM). The pointer generation block 58 may also synchronize the read pointers used by the read FIFO latches of each set 40 of PSIO buffers 42 and each PDIO module 44, enabling the read FIFO latches to reliably drain the captured data into an internal clock domain for core fabric (e.g., programmable logic fabric 16) consumption. Moreover, the pointer generation block 58 may manage or control the read FIFO latches of each set 40 of PSIO buffers 42 and each PDIO module 44.

The pointer generation block 58 includes a data load control block 70 that controls a write pointer to capture and load FIFO latches of each set 40 of PSIO buffers 42 and each PDIO module 44. The pointer generation block 58 also includes a data capture control block 72 that controls a data capture scheme using the read FIFO latches. For example, the data capture scheme may include a free running clock receiver mode or a strobe receiver mode. The pointer generation block 58 further includes a data drain control block 74 that controls a read pointer (e.g., rdptr 86) to drain (e.g., to advance the read pointer 86) the read FIFO latches based on a data drain mode (e.g., push mode or pull mode). In a pull mode, soft logic of the communication interface 12 knows when to unload data. In a push mode, data is pushed into the soft logic when received.

The data drain control block 74 may initially reset the pointers of the pointer generation block 58 using a pointer reset configuration bit 76 (i.e., cfg_ptr_rst_b). The data drain control block 74 may release the pointers from reset asynchronously.

The data capture control block 72 may include a receiver mode configuration bit 77 (e.g., RCVMODE) that may be used to enter the free running clock receiver mode or the strobe receiver mode. In the free running clock receiver mode, setting or clearing a pointer enable configuration bit 78 (e.g., PTREN) may synchronously (e.g., via a double or triple synchronizer 80) start a write pointer in the receive clock domain (e.g., a write clock signal 82 (wrclk)). In the strobe receiver mode, setting or clearing the pointer enable configuration bit 78 may asynchronously start the write pointer in the receive clock domain 82. The data drain control block 74 may include a receiver control select bit 84 (e.g., RCVSEL) that may be used to enter the pull mode (e.g., a core-controller read enable) or the push mode (e.g., a valid-based read enable). The pull mode may enable deskewing across wider bonded 48-IO modules 30 by controlling the core-controller read enable to assert only when all the data across a respective wider 48-IO module 30 is sampled (e.g., at an active clock edge).

Figure 6:
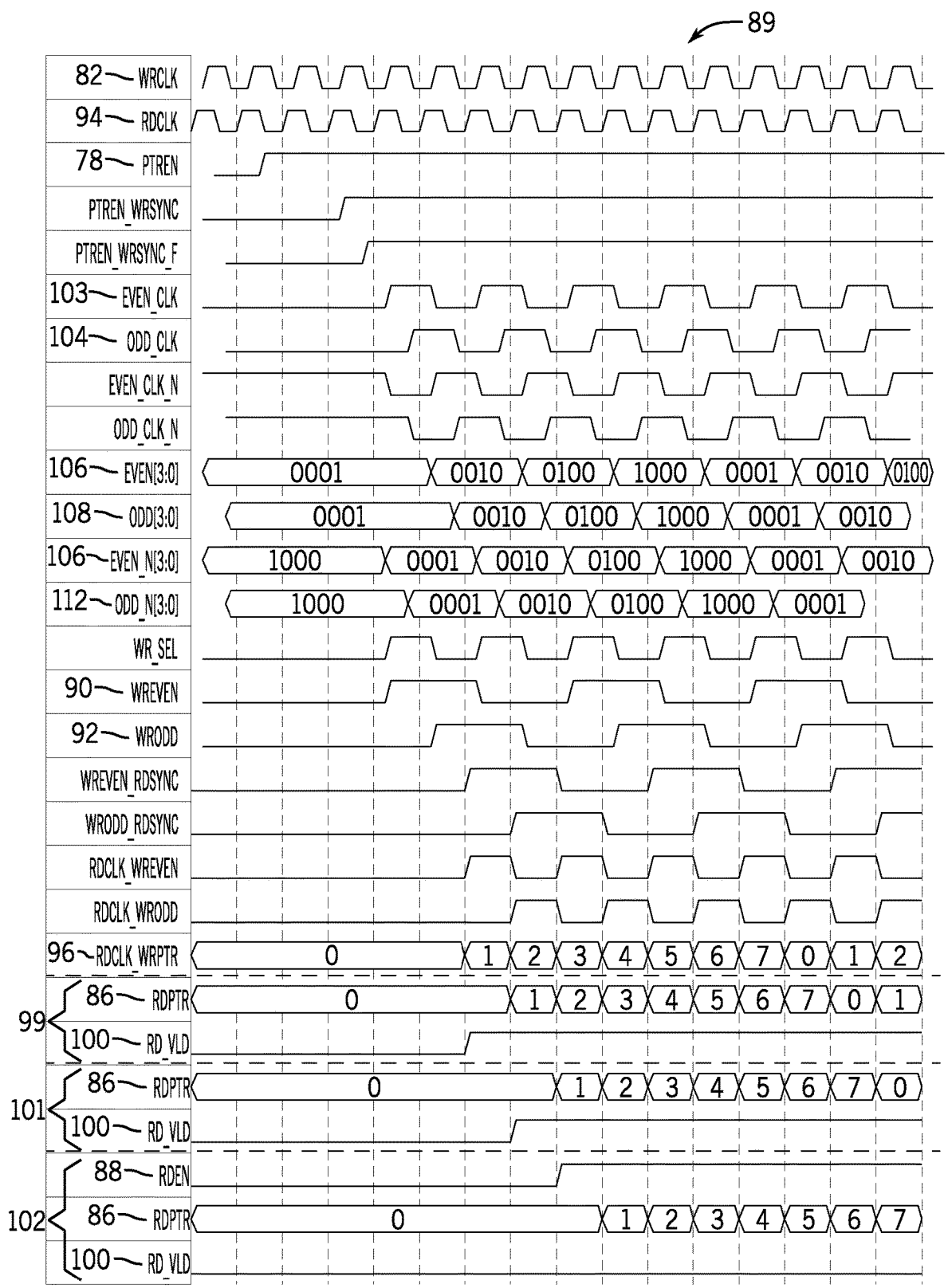
FIG. 6 is a first example timing diagram of the pointer generation block of FIG. 5 when operating in a free running clock receiver mode, in accordance with an embodiment.

FIG. 6 is a first example timing diagram 89 of the pointer generation block 58 of FIG. 5 when operating in the free running clock receiver mode, in accordance with an embodiment. The free running clock receiver mode may be set by setting or clearing the receiver mode configuration bit 77 (e.g., RCVMODE). Because the pointer generation block 58 is operating in the free running clock receiver mode, the write clock signal 82 (wrclk) includes regular pulses.

In the push mode, the data drain control block 74 may use the pointer enable configuration bit 78 in the receive clock domain 82 to enable cross-clocking divided events (e.g., an even write signal 90 (wreven) and an odd write signal 92 (wrodd)) into a capture/drain clock domain (e.g., a read clock signal 94 (rdclk)) when there is an event (e.g., clock edge or strobe) in the receive clock domain 82. The data drain control block 74 may divide the events (e.g., the even write signal 90 and the odd write signal 92) into even and odd to prevent event loss due to meta-stability. The data drain control block 74 may then merge the cross-clocked events (e.g., the even write signal 90 and the odd write signal 92) to form a write pointer 96 (rdclk_wrptr). The data drain control block 74 may compare the read pointer 86 to the write pointer 96 in the capture/drain clock domain 94 and automatically advance (drain) the read pointer 86 when there is one or more events captured after a clock delay associated with a receive pointer separation (RCVPS) configuration bit 98 elapses.

A first example 99 illustrates the read pointer (e.g., rdptr 86) draining (e.g., to advance the read pointer 86) the read FIFO latches in the push mode after a one clock delay. The push mode may be set by setting or clearing the receiver control select bit 84 (e.g., RCVSEL). The data drain control block 74 may also generate and return a corresponding read valid indication signal 100 (rd_vld) along with read data to indicate valid data for consumption. A second example 101 illustrates the read pointer 86 draining the read FIFO latches in the push mode after a two clock delay. The amount of delay may be set by setting or clearing the receive pointer separation (RCVPS) configuration bit 98.

A third example 102 illustrates the read pointer 86 draining the read FIFO latches in the pull mode. In the pull mode, the read pointer 86 may be incremented when a core-controlled read enable 88 (rden) is asserted. As such, draining a read FIFO latch may be controlled by a core (e.g., located in the programmable logic fabric 16) of the programmable logic device 10. The pull mode may be set by setting or clearing the receiver control select bit 84 (e.g., RCVSEL).

The read FIFO latches of each set 40 of PSIO buffers 42 and each PDIO module 44 may capture or latch receive data using both edges of divided receive free running clocks or strobe clocks (e.g., an even clock signal 103 (even_clk) and an odd clock signal 104 (odd_clk)) and latch the receive data using even latch enables 106 and 108 (even[3:0] and even_n [3:0]) and odd latch enables 110 and 112 (odd[3:0] and odd_n[3:0]). The even clock signal 103 may divide each rising edge of the receive free running clocks or strobe clocks 103 and 104, while the odd clock signal 104 may divide each falling edge of the receive free running clocks or strobe clocks 103 and 104. The even latch enables 106 and 108 and the odd latch enables 110 and 112 may guarantee that one latch may always be opened (transparent) to enable capture data to flow through. In some embodiments, only two or less latch enables (e.g., of 106, 108, 110, 112) may toggle at each receive clock edge. The read FIFO latches of each set 40 of PSIO buffers 42 and each PDIO module 44 may only switch at most two entries (e.g., closing one latch and opening the other) with each sample, regardless of the depth of the read FIFOs. This may reduce the switching of the read FIFO latches, reducing peak current consumption of each set 40 of PSIO buffers 42 and each PDIO module 44, regardless of a depth of the read FIFO latches of each set 40 of PSIO buffers 42 and each PDIO module 44.

Figure 7:
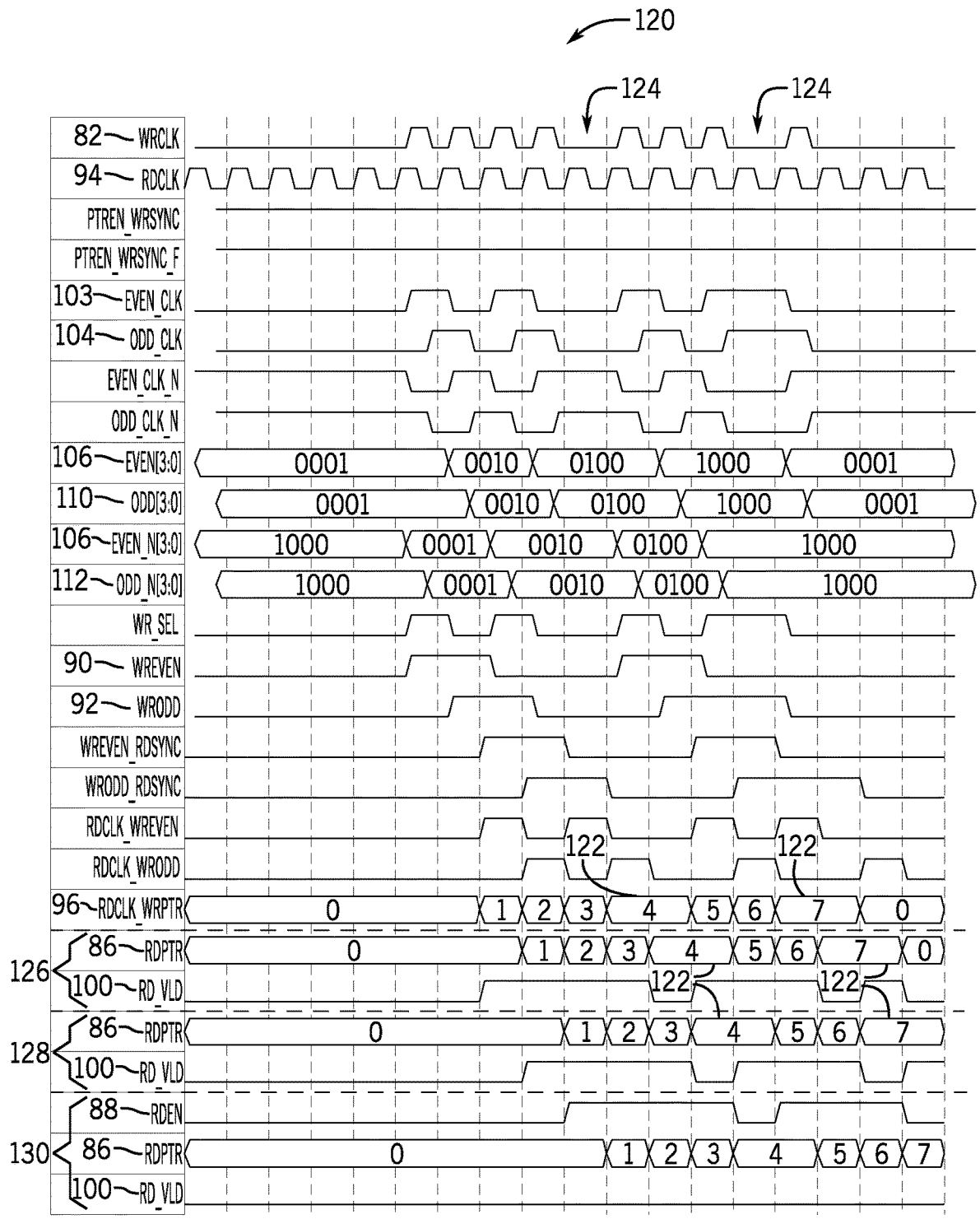
FIG. 7 is a second example timing diagram of the pointer generation block of FIG. 5 when operating in a strobe receiver mode, in accordance with an embodiment.

FIG. 7 is a second example timing diagram 120 of the pointer generation block 58 of FIG. 5 when operating in the strobe receiver mode, in accordance with an embodiment. The strobe receiver mode may be set by setting or clearing the receiver mode configuration bit 77 (e.g., RCVMODE). Because the pointer generation block 58 is operating in the strobe receiver mode, the write clock signal 82 (wrclk) only includes pulses when writing is desired (e.g., enabled). As such, the write pointer 96 (rdclk_wrptr) and the read pointer 86 may include irregular length periods (e.g., 122) due to corresponding periods 124 of the write clock signal 82 (wrclk) not being enabled.

A first example 126 illustrates the read pointer (e.g., rdptr 86) draining the read FIFO latches in the push mode after a one clock delay. A second example 128 illustrates the read pointer 86 draining the read FIFO latches in the push mode after a two clock delay. A third example 130 illustrates the read pointer 86 draining the read FIFO latches in the pull mode. In the pull mode, the read pointer 86 may be incremented when the core-controlled read enable 88 (rden) is asserted.

Figure 8:
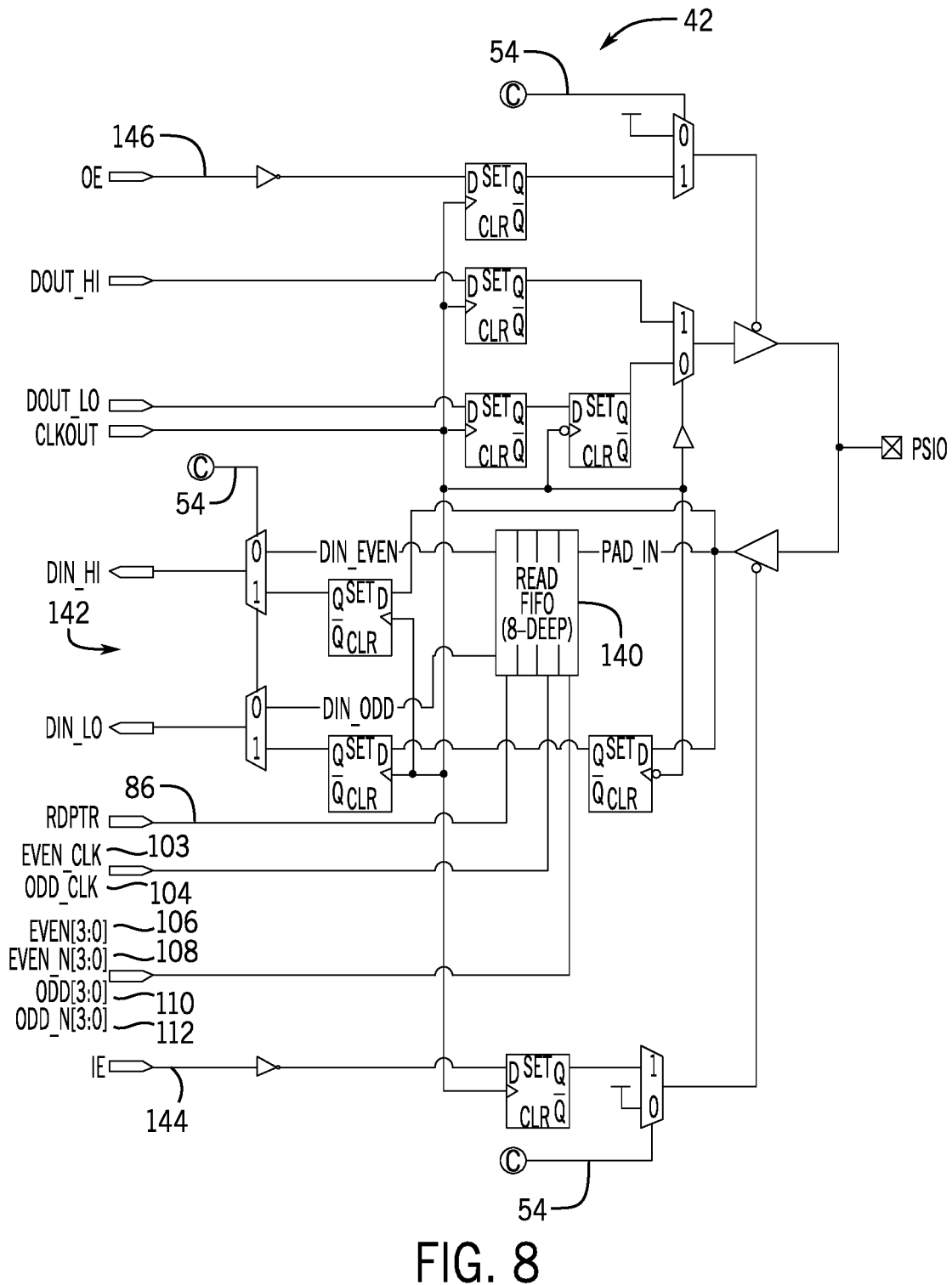
FIG. 8 is a schematic diagram of a programmable single-ended input/output (PSIO) buffer of the clock partitioning portion of the input/output circuitry of FIG. 4, in accordance with an embodiment.

FIG. 8 is a schematic diagram of the PSIO buffer 42 of the PSIO set 40 of FIG. 4, in accordance with an embodiment. The PSIO buffer 42 includes the read FIFO latches 140. As illustrated, the read FIFO latches 140 are eight words deep. In other embodiments, the read FIFO latches 140 may be any other suitable depth, such as 16 words deep, 32 words deep, 64 words deep, and the like. The PSIO buffer 42 includes a data input select configuration bit 142 (DINSEL) that may enable reading the read FIFO latches 140 or reading a physical layer (PHY) clock flop. The PSIO buffer 42 also includes an input enable configuration bit 144 (IE) that may enable or disable an input receiver. The PSIO buffer 42 further includes an output enable configuration bit 146 (OE) that may enable or disable an output driver.

Figure 9:
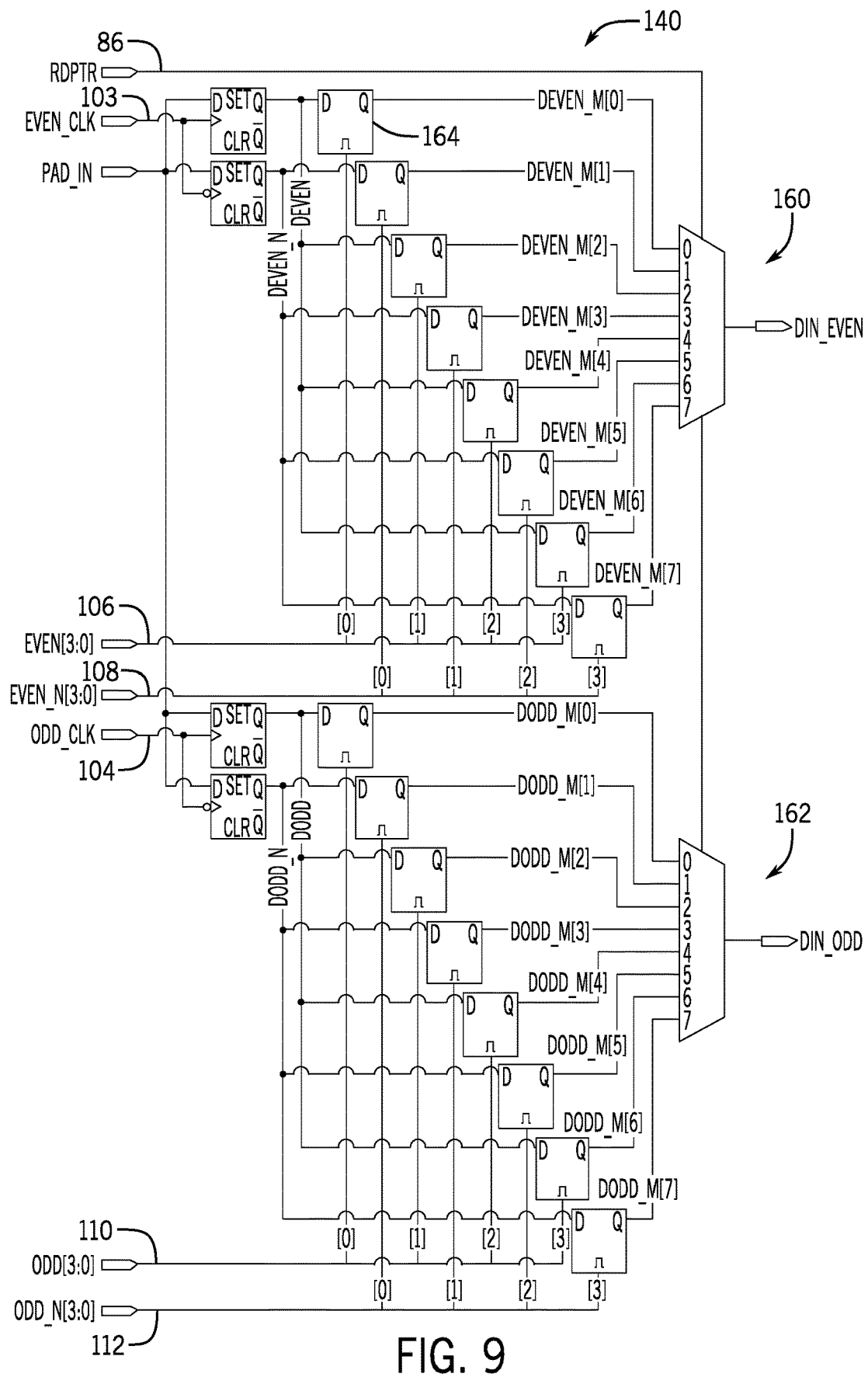
FIG. 9 is a schematic diagram of read first in first out (FIFO) latches of the PSIO buffer of FIG. 8, in accordance with an embodiment.

FIG. 9 is a schematic diagram of the read FIFO latches 140 of the PSIO buffer 42 of FIG. 8, in accordance with an embodiment. The read FIFO latches 140 are partitioned into an even capture/drain data path 160 and an odd capture/drain data path 162. The even capture/drain data path 160 may capture or latch data on the rising edge of the receive clock/strobe. The odd capture/drain data path 162 may capture or latch data on the falling edge of the receive clock/strobe.

Each latch or flip-flop 164 may capture and hold the receive data for at least two clock cycles. As such, there may always be one open latch 164 that enables transparent data to flow through. At any receive clock/strobe edge (e.g., rising or falling), only two latch enables (e.g., even latch enables 106 and 108 (even[3:0] and even_n[3:0]) or odd latch enables 110 and 112 (odd[3:0] and odd_n[3:0])) may toggle. One of the two latch enables may close a current latch location and the other may open a next latch location in the read FIFO latches 140. Having only two latch enables toggle at any receive clock/strobe edge scales to deeper read FIFO depths and reduces peak current consumption. Each latch 164 may close with a hold guarantee of two unit intervals, propagating the latch enables (e.g., 106, 108, 110, 112) with relaxed timing, further reducing current consumption.

The read pointer 86 may be used to index the read FIFO latches 140 and drain the read FIFO latches 140 based on the receiver mode and a function used to configure the pointer generation block 58. For example, if receive control logic (e.g., disposed in the distribution strip and physical layer (PHY) logic area 36) is configured for the push mode, the read pointer 86 may drain the read FIFO latches 140 when any data set is captured in read FIFO latches 140 of a corresponding 48-IO module 30 after the clock delay associated with the receive pointer separation (RCVPS) configuration bit 98 elapses. The push mode may enable data to be received by the soft logic in a core (e.g., located in the programmable logic fabric 16) of the programmable logic device 10, without knowledge of timing of when the receive data arrives. This may be the case when the communication interface 12 receiving commands or data in master-to-master or slave-to-master configurations.

If the receive control logic is configured for the pull mode, the read pointer 86 may drain the read FIFO latches 140 when the soft logic is ready to consume the data. The pull mode may also be used to deskew read data across multiple 48-IO modules 30 in the memory device 14. In some embodiments, a single read FIFO latch may both capture and deskew data, enabling scaling to deeper read depths of the read FIFO latches 140 to handle greater skews between 48-IO modules 30 while reducing or maintaining peak current consumption in the communication interface 12.

Figure 10:
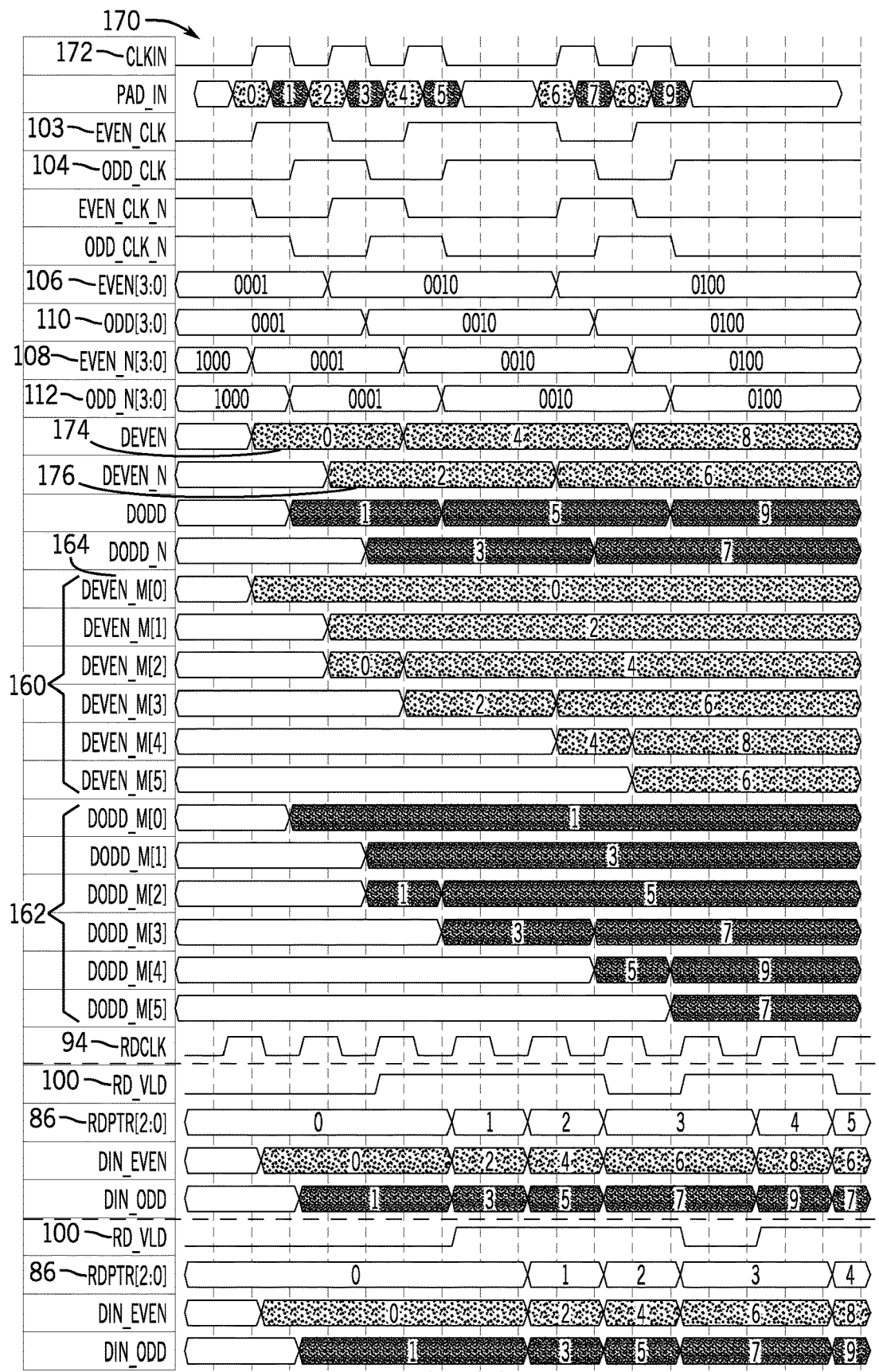
FIG. 10 is a third example timing diagram of the read FIFO latches of FIG. 9 when operating in the push mode, in accordance with an embodiment.

FIG. 10 is a third example timing diagram 170 of the read FIFO latches 140 of FIG. 9 when operating in the push mode, in accordance with an embodiment. The even capture/ drain data path 160 may capture or latch data on the rising edge of the receive clock/strobe 172 (e.g., clkin). The odd capture/drain data path 162 may capture or latch data on the falling edge of the receive clock/strobe 172.

Each latch or flip-flop 164 may capture and hold the receive data for at least two clock cycles. For example, an even latching signal 174 illustrates guaranteeing a two unit interval hold before closing. The even latching signal 174 (e.g., deven) is the sample data on the rising edge of the clock of the even clock signal 103. As such, the latch enable signals (e.g., 106, 108, 110, 112) propagate with relaxed timing, reducing current consumption. An inverted even latching signal 176 illustrates captured data in a period of greater than or equal to two clock cycles to enable relaxed timing to meet setup and hold timings of the read FIFO latches 140.

The read pointer 86 may drain the read FIFO latches 140 when any data set is captured in read FIFO latches 140 of a corresponding 48-IO module 30 after the clock delay associated with the receive pointer separation (RCVPS) configuration bit 98 elapses. A first example 178 illustrates the read pointer (e.g., rdptr[2:0] 86) draining the read FIFO latches after a one clock delay. A second example 180 illustrates the read pointer 86 draining the read FIFO latches in the push mode after a two clock delay.

Figure 11:
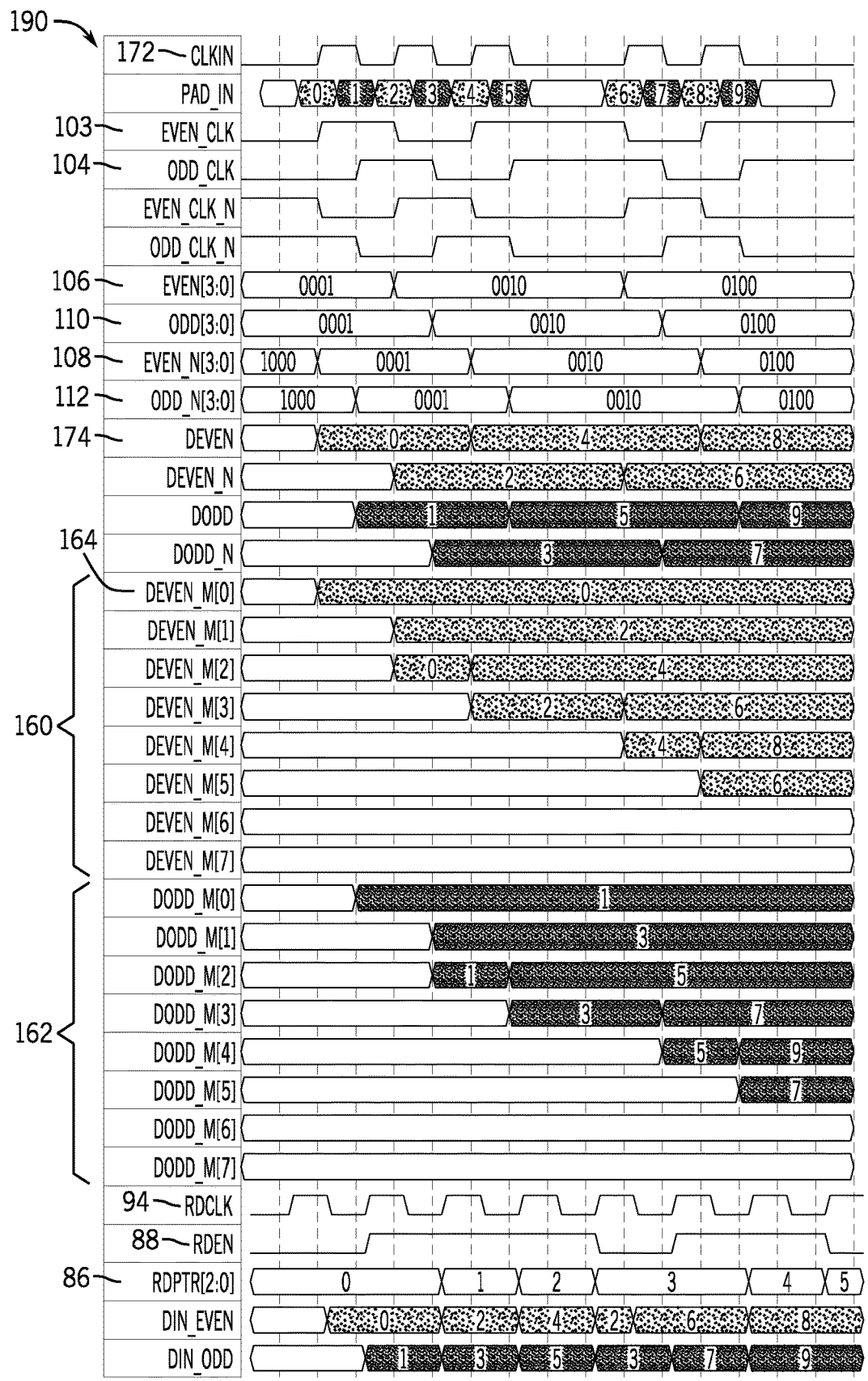
FIG. 11 is a fourth example timing diagram of the read FIFO latches of FIG. 9 when operating in the pull mode, in accordance with an embodiment.

FIG. 11 is a fourth example timing diagram 190 of the read FIFO latches 140 of FIG. 9 when operating in the pull mode, in accordance with an embodiment. The read pointer 86 may drain the read FIFO latches 140 when any data set is captured in read FIFO latches 140 of a corresponding 48-IO module 30 after the clock delay associated with the receive pointer separation (RCVPS) configuration bit 98 elapses. A first example 178 illustrates the read pointer (e.g., rdptr[2:0] 86) draining the read FIFO latches after a one clock delay. A second example 180 illustrates the read pointer 86 draining the read FIFO latches in the push mode after a two clock delay.

The read pointer 86 may drain the read FIFO latches 140 when the soft logic is ready to consume the data and the core-controlled read enable 88 (rden) is asserted. The core-controlled read enable 88 may be used to synchronously drain data across multiple 48-IO modules 30.

Enabling each set 40 of PSIO buffers 42 and each PDIO module 44 of each 48-IO module 30 to share the centralized pointer generation block 58 facilitates enabling the communication interface 12 to function as either a slave or master in master-to-slave or master-to-master configurations with other integrated circuits. Enabling each set 40 of PSIO buffers 42 and each PDIO module 44 of each 48-IO module 30 to share a received clock signal that may either be free running or strobe-based also facilitates enabling the communication interface 12 to function as either a slave or master in master-to-slave or master-to-master configurations with other integrated circuits. Enabling each set 40 of PSIO buffers 42 and each PDIO module 44 of each 48-IO module 30 to share read FIFO latches 140 of the PSIO buffers 42 to push or pull data, further facilitates enabling the communication interface 12 to function as either a slave or master in master-to-slave or master-to-master configurations with other integrated circuits. Moreover, enabling the read FIFO latches 140 to close with a hold guarantee of two unit intervals and capture data in a period of greater than or equal to two clock cycles enables relaxed timing of the read FIFO latches 140. Scaling to deeper depths in the read FIFO latches 140 may facilitate handling larger skews between bonded 48-IO modules 30. Peak current may still be maintained for the deepened read FIFO latches 140 due to latch structure controls (e.g., such that only two read FIFO latches 140 toggle at any active clock edge). As such, deeper read FIFO latches 140 may be scaled without increasing peak current consumption by the communication interface 12.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A communication interface comprising:
   one or more input/output circuitries, each input/output circuitry comprising:
   a plurality of input/output buffers comprising a plurality of write pointers and a plurality of read pointers;
   a pointer generation block communicatively coupled to the plurality of input/output buffers, wherein the pointer generation block is configured to synchronize the plurality of write pointers and synchronize the plurality of read pointers;
   a receive delay-locked loop configured to select a common clock signal and provide the selected common clock signal to the plurality of input/output buffers via the pointer generation block;
   a first transmit delay-locked loop configured to delay the selected common clock signal to generate a first delayed clock signal and provide the first delayed clock signal to a first set of input/output buffers of the plurality of input/output buffers; and
   a second transmit delay-locked loop configured to delay the selected common clock signal to generate a second delayed clock signal and provide the second delayed clock signal to a second set of input/output buffers of the plurality of input/output buffers.

2. The communication interface of claim 1, wherein each input/output buffer of the plurality of input/output buffers comprises a plurality of read first in first out (FIFO) latches, wherein each read FIFO latch of the plurality of read FIFO latches captures data and deskews the data.

3. A communication interface comprising:
   a plurality of input/output modules distributed along the communication interface, wherein each input/output module comprises:
   a plurality of programmable single-ended input/output (PSIO) buffers comprising a plurality of read first in first out (FIFO) latches, a plurality of write pointers, and a plurality of read pointers, wherein the plurality of read FIFO latches is configured to use the plurality of write pointers for writing data, and wherein the plurality of read FIFO latches is configured to use the plurality of read pointers for reading data;
   a pointer generation block communicatively coupled to the plurality of PSIO buffers, wherein the pointer generation block is configured to synchronize the plurality of write pointers and synchronize the plurality of read pointers;
   a receive delay-locked loop configured to select a clock signal and provide the selected clock signal to the plurality of PSIO buffers via the pointer generation block; and
   one or more transmit delay-locked loops that delay the selected clock signal.

4. The communication interface of claim 3, wherein each read FIFO latch of the plurality of read FIFO closes with a hold guarantee of two unit intervals.

5. The communication interface of claim 3, wherein each read FIFO latch of the plurality of read FIFO latches captures data in a period greater than or equal to two clock cycles.

6. The communication interface of claim 3, wherein two read FIFO latches of the plurality of read FIFO latches toggle at each rising edge and each falling edge of the selected clock signal.

7. The communication interface of claim 3, wherein each read FIFO latch of the plurality of read FIFO comprises an even capture/drain data path and an odd capture/drain data path.

8. The communication interface of claim 7, wherein the even capture/drain data path captures first data on a rising edge of the selected clock signal, and the odd capture/drain data path captures second data on a falling edge of the selected clock signal.

9. A system comprising:
   a memory device;
   a first integrated circuit comprising a communication interface coupled to the memory device, wherein the communication interface comprises:
      a plurality of input/output circuitries distributed along the communication interface, wherein each input/output circuitry comprises:
         a plurality of programmable single-ended input/output (PSIO) buffers comprising a first plurality of write pointers and a first plurality of read pointers;
         a plurality of programmable differential/single-ended input/output (PDIO) modules comprising a second plurality of write pointers and a second plurality of read pointers;
         a pointer generation block communicatively coupled to the plurality of PSIO buffers and the plurality of PDIO buffers, wherein the pointer generation block is configured to synchronize the first plurality of write pointers, synchronize the first plurality of read pointers, synchronize the second plurality of write pointers, and synchronize the second plurality of read pointers;
      a receive delay-locked loop configured to select a clock signal and provide the selected clock signal to the plurality of PSIO buffers and the plurality of PDIO modules via the pointer generation block;
      a first transmit delay-locked loop configured to delay the selected clock signal to generate a first delayed clock signal and provide the first delayed clock signal to a first set of PDIO buffers of the plurality of PDIO buffers; and
      a second transmit delay-locked loop configured to delay the selected clock signal to generate a second delayed clock signal and provide the second delayed clock signal to a second set of PDIO buffers of the plurality of PDIO buffers; and
   a second integrated circuit communicatively coupled to the communication interface.

10. The system of claim 9, wherein the first integrated circuit is a field programmable gate array, and the second integrated circuit is a field programmable gate array, an application-specific integrated circuit, or an application specific standard product.

11. The system of claim 9, wherein the second integrated circuit comprises one or more additional memory devices.

12. The system of claim 9, wherein the second integrated circuit issues commands to the communication interface.

13. The system of claim 9, wherein the communication interface issues commands to the second integrated circuit.

14. The system of claim 9, wherein, in a first instance, the second integrated circuit issues commands to the communication interface, and in a second instance, the communication interface issues commands to the second integrated circuit.

15. The communication interface of claim 1, wherein the plurality of input/output buffers comprises one or more programmable differential/single-ended input/output (PDIO) buffers.

16. The communication interface of claim 1, wherein the clock signal comprises a free running clock or a strobe-based clock.

17. The communication interface of claim 16, wherein synchronizing the plurality of write pointers enables the pointer generation block to capture incoming data using the free running clock or the strobe-based clock.

18. The communication interface of claim 17, wherein synchronizing the plurality of read pointers enables the pointer generation block to drain the captured incoming data into a clock domain of programmable logic fabric comprising the communication interface.

19. The communication interface of claim 1, wherein the receive delay-locked loop is configured to select the common clock signal from an input/output buffer of the plurality of input/output buffers.

20. The communication interface of claim 1, wherein each input/output circuitry is virtually partitioned into a plurality of virtual partitions, wherein a first virtual partition of the plurality of virtual partitions comprises the first set of input/output buffers, wherein the second virtual partition of the plurality of virtual partitions comprises the second set of input/output buffers, wherein the first delayed clock signal generated by the first transmit delay-locked loop is distributed to the first virtual partition, and wherein the second delayed clock signal generated by the second transmit delay-locked loop is distributed to the second virtual partition.

* * * * *